INVENTOR
LOUIS J. STOYANOFF
BY Ralph N. Kalish
ATTORNEY

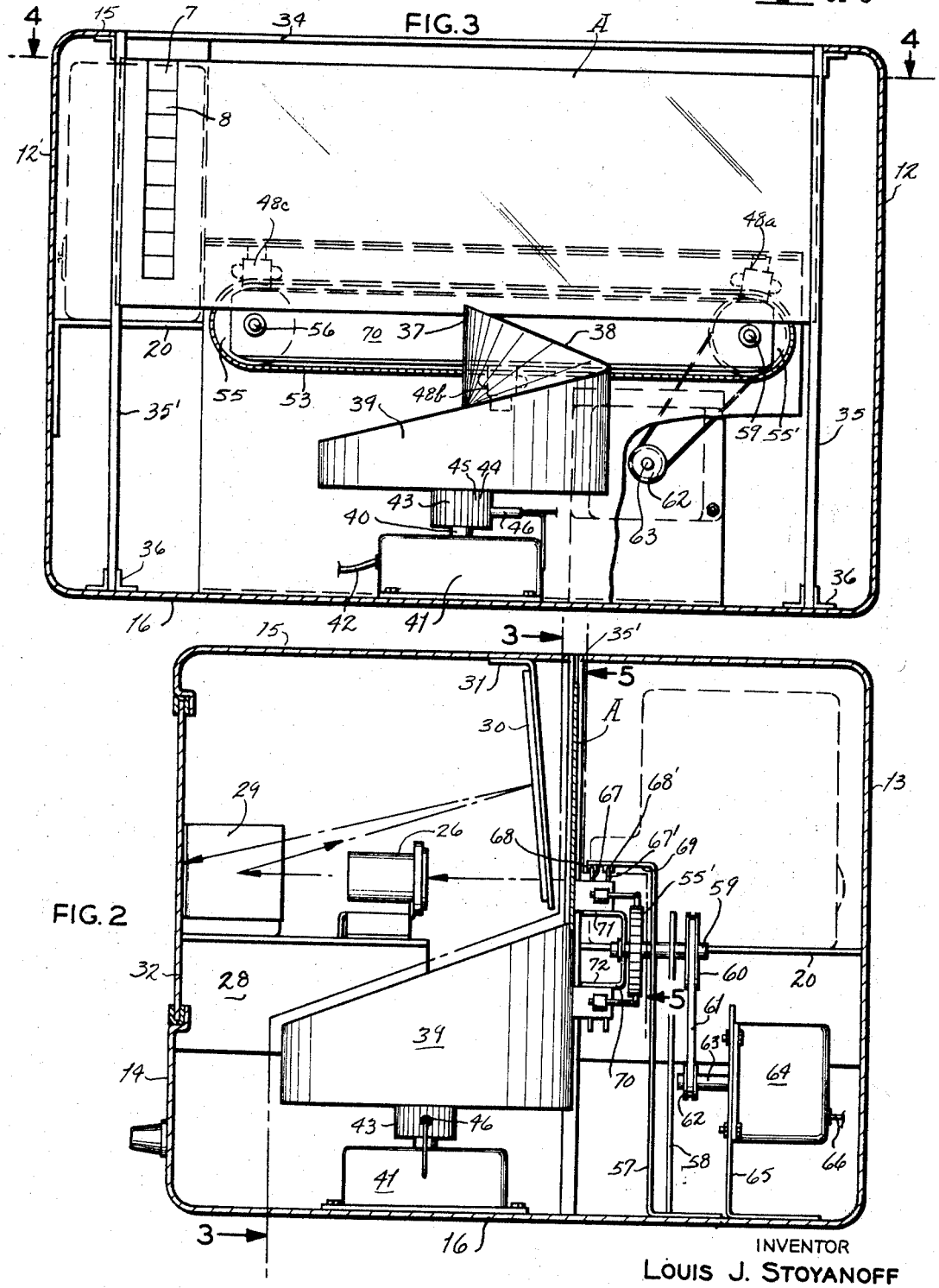

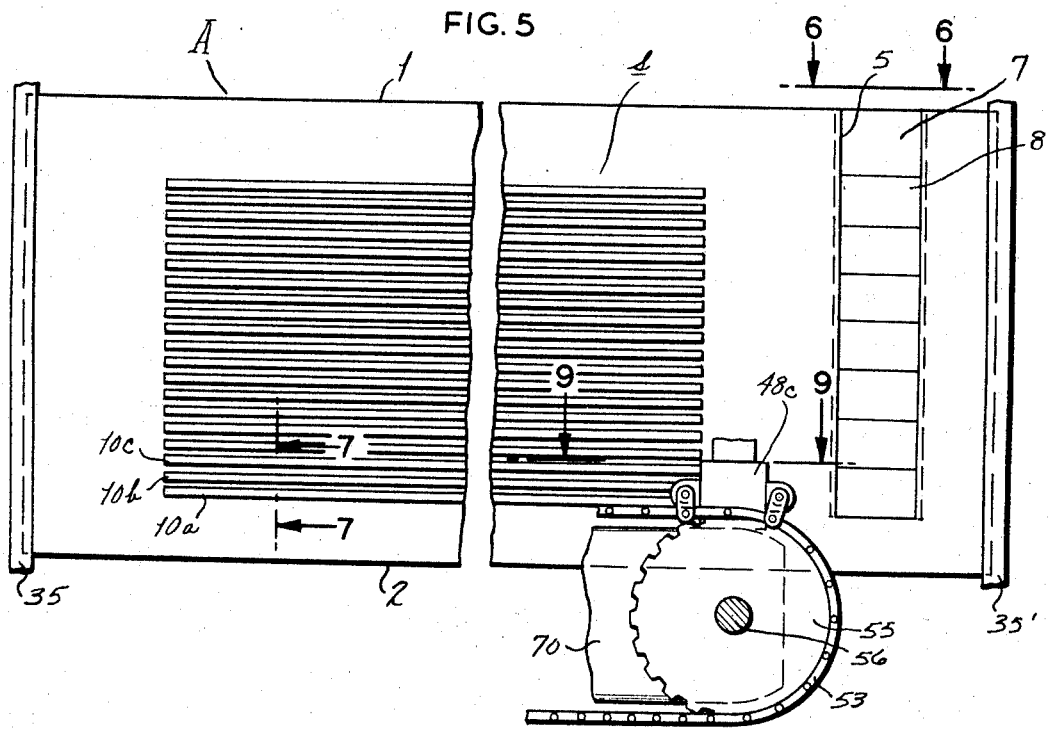

United States Patent Office 3,434,784
Patented Mar. 25, 1969

3,434,784
FILM STRIP AND SOUND TRACK CARRIER
Louis J. Stoyanoff, Woodland Hills, Calif., assignor to Hoffman Information Systems, Inc., a corporation of California
Filed Dec. 16, 1965, Ser. No. 514,342
Int. Cl. G03b *31/06*
U.S. Cl. 353—19      3 Claims

ABSTRACT OF THE DISCLOSURE

A film strip and sound track carrier having a plurality of frames mounted vertically along one side which can be projected by a suitable audio-visual device. The carrier is further provided with a magnetic sound track associated with each frame and positioned horizontally adjacent to it. Equipment is disclosed for sequentially projecting the frames and reproducing the sound track associated with each frame while the latter is being projected.

---

This invention relates in general to picture projection and sound reproduction and, more particularly, to a carrier unit, for still picture projection and sound tracks for coordinated sound reproduction therewith.

The problem of synchronizing sound reproduction with picture slides and film strips has long beset the industry. Numerous expedients have been attempted, but none have proved fully satisfactory, except for possibly limited or special applications. Among such efforts have been devices incorporating a single slide or film strip frame and a conventional circular type sound record disc, which have proved bulky and quite inadequate for proper sequential projection.

Other efforts have comprised film strips wherein the picture portion and the sound record portion are presented alternately, so that the viewer does not have the benefit of the picture and the commentary simultaneously. Still further efforts have comprised circular devices so as to present the film material in a circumferential pattern about central record discs, which devices have required rather complex equipment for projection and reproduction in that they incorporate the conventional tone arm as found on phonographs. The deficiencies of current devices has become all the more apparent in view of the ever-increasing demands for audio-visual instruction in the education field, wherein the individual students are encouraged to use audio-visual equipment in an independent, unsupervised manner. It is important that the materials to be studied be contained within units or devices which are relatively rigid and resistant to damage through careless and rough handling and which will present the material to be studied in a relatively extensive sequential manner so that the students' concentration will not be frequently interrupted by the need for change of material. With the almost limitless areas of study amenable to presentation in this manner, the number of audio and visual material-containing articles would be myriad, so that the proper and reliable coordination of the related pictorial matter and sound material is of the utmost criticality. Students cannot be expected to be concerned with the problems of matching slides and sound material or for effecting synchronization of the same.

It is an object of the present invention to provide a film strip and sound track carrier unit which integrally retains the film strip and its related sound material in such relationship so that at all times, the projection of the film will be fully synchronized with the sound material.

It is another object of the present invention to provide a film strip and sound track carrier wherein the sound material will be reproduced simultaneously with the projection of the related film portion.

It is another object of the present invention to provide a film strip and sound track carrier, which is quite compact, being fundamentally formed of durable, yet light-weight material, for ease of handling and being resistant to breakage or damaging through careless handling; which may be stored in minimum space.

It is a further object of the present invention to provide a film strip and sound track carrier which may be most economically manufactured; which is adapted for sequential presentation of intellectual matter through a relatively extended interval, so that the user is assured a reasonable unbroken concentration span; which may be utilized in relatively simple projection and reproduction equipment; and which is reliable in usage.

Other objects and details of the invention will be apparent from the following description, when read in connection with the accompanying drawings wherein:

FIGURE 2 is a vertical transverse sectional view taken substantially on the line 2—2 of FIGURE 1.

FIGURE 3 is a vertical transverse sectional view taken substantially on the line 3—3 of FIGURE 2.

FIGURE 5 is a vertical transverse sectional view taken substantially on the line 5—5 of FIGURE 2.

FIGURE 6 is a plan view taken on the line 6—6 of FIGURE 5.

FIGURE 7 is a vertical transverse sectional view taken substantially on the line 7—7 of FIGURE 5.

FIGURE 8 is a vertical transverse sectional view taken substantially on the line 7—7 of FIGURE 5.

FIGURE 9 is a top plan view of a magnetic head.

Figures 1, 4:
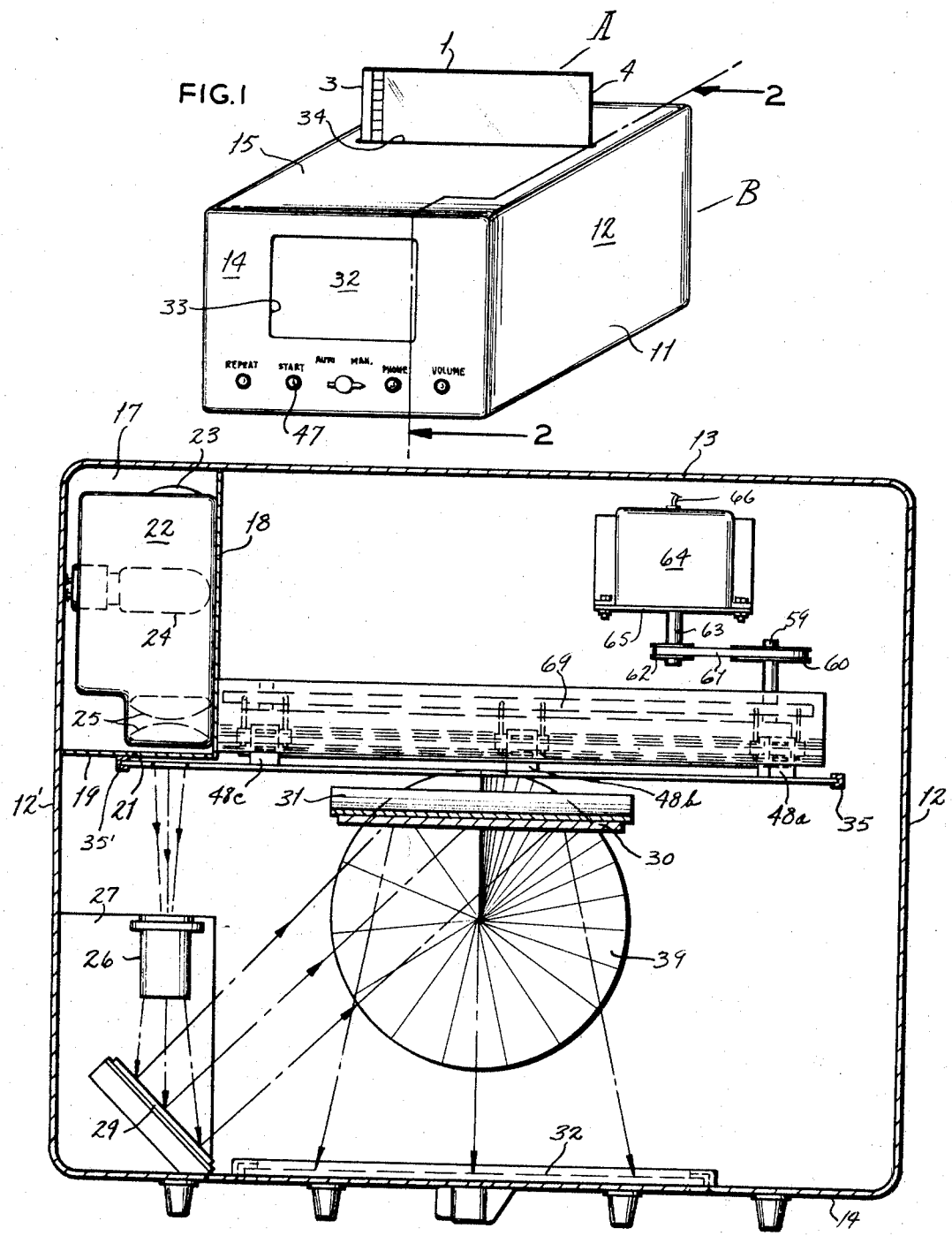
FIGURE 1 is a perspective view of a film projecting and sound reproducing device designed for use with a film strip and sound track carrier constructed in accordance with and embodying the present invention, illustrating such carrier in the course of being received within said device.
FIGURE 4 is a horizontal transverse sectional view taken on the line 4—4 of FIGURE 3.

Referring now by reference characters to the drawings and, more particularly, to FIGURES 5, 6, 7, and 8, A generally designates a film strip and sound track carrier for use with a projection and reproduction device as of the type indicated at B, which latter will be described more fully hereinbelow.

Carrier A constitutes a flat rectangular, relatively thin plate of substantially card-like character, being fabricated of plastic or other suitable material as by any conventional molding process. Said carrier comprises top and bottom parallel horizontally extending edges 1, 2 and parallel vertically extending side edges 3, 4. Said carrier A is provided in one side portion with a vertically extending recess 5, which opens at its upper end through top edge 1, and terminates at its lower, closed end immediately upwardly of bottom edge 2. The vertical side edges of recess 5 are parallel and are of inwardly tapering or recessed or grooved character, as indicated at 5', for lockingly retaining a film strip holder 6, having a complementarily formed side edge 6' for slidable retentive reception within the grooved side edges of recess 5. Said film holder 6 is of clear transparent plastic and suitably contains a film strip 7 comprised of a plurality of vertically arranged film frames 8, one above the other, containing visual material for projection. It is apparent that the number of frames 8 in any one film strip 7 will be dependent entirely upon the pre-determined vertical extent of recess 5. Merely for purposes of illustration, film strip 7 is shown as comprising eight film strip frames 8 which are adapted to be successively projected, from the lowest one, upwardly to the uppermost one, in a manner to be described. Film strip holder 6 is readily received within recess 5, retained by friction against inadvertent displacement. If desired, the same may be positively engaged as by the use of suitable cementitious materials, but it should be observed that by means of the co-action of film strip holder 6 and recess 5 of carrier A, a change of visual material may be easily brought about.

Provided either on its normally forward or normally rearward face, adjacent recess 5, carrier A may be provided with sound recorded material, as indicated broadly, at $s$. For purposes of illustration only, such material $s$ is illustrated herein as being presented upon the normally rearwardly directed face of carrier A. The recorded material may be applied to carrier A by any well-known techniques, such as by the provision of the sound grooves 9, as shown in FIGURE 7, or by the provision of sound tracks 10 through the provision of magnetically recorded matter. It should be understood that the precise character of the sound tracks, whether grooves 9 or applied strips 10, is not critical to the present invention. It is to be particularly noted that the sound tracks are of linear character, extending transversely of carrier A in axial parallel relaitonship to top and bottom edges 1, 2 and with the axes thereof perpendicular to the axis of travel of film strip 7 during the course of the sequential presentation of frames 8 for projection. One or more sound tracks 10 are provided adjacent the related film strip frame 8 and within an area bounded by lines coincidental wtih the upper and lower margins of the related film strip frame 8. The length of each sound track 10 will be determined by the overall length of carrier A, and by the amount of sound material to be reproduced for the associated film strip frame 8.

In order to conduce to the compactness of carrier A, and to subtsantially relatively reduce the length thereof, the sound material for each film strip frame 8 may be presented in a multiplicity of sound tracks 10, which are arranged one above the other, in axial parallel relationship, but being confined within the area above delineated. For purposes of example, the drawings herein disclose or illustrate three such sound tracks 10 for each film strip frame 8, with the same being referred to as 10a, 10b, and 10c.

From the foregoing, it is to be noted that carrier A is relatively rigid for ease of handling and manipulation, as well as for storage; and being flat, the same may be stored conveniently and so arranged for selective ready withdrawal from storage. The sound material and visual matter are intimately mounted upon carrier A and arranged for positive, reliable synchronization of each film strip frame 8 with its related sound recording, so that the user is spared any problems concerning co-ordination of the same. As will be shown hereinbelow, the axes of sound tracks 10, being normal to the travel path of the film strip 7 bring about a unique interrelationship, so that projection and reproduction may be easily accomplished contemporaneously without the use of complex, bulky equipment. Carrier A may be so constructed as to be exceedingly durable and wear resistant. Each carrier A may be used for different matter, by means of replacement of the particular film holder 6 and exercise of customary techniques for erasure and subsequent rerecording.

The film strip and sound track carrier of the present invention may be used in various type sof audio-visual devices which incorporate projection and reproduction means. For purposes of illustration, one such device is shown herein, being indicated at B, as above stated, and incorporates a housing 11, formed as of sheet metal, plastic or other rigid, durable material. Housing 11 comprises parallel side walls 12, 12', a rear wall 13, a front wall 14, a top wall 15, and base wall 16; there being provided an opening (not shown) for permitting access to the interior of housing 11. Provided within housing 11, in preferably one rearward corner thereof, is a compartment 17, defined by adjacent sections of side wall 12' and rear wall 13, and by partitions 18, 19, respectively parallel thereto, with a horizontal base plate 20, spaced upwardly of base wall 16; said partitions 18, 19 and plate 20, being secured in any suitable manner to the adjacent portions of housing 11. Formed within partition 19 is opening 21 for light projection therethrough, from a projection unit 22, disposed within compartment 17. Said projection unit 22 comprises the customary parabolic reflector 23, lamp 24 and condensing lenses 25, for cooperation with projection lens system 26, presented spacedly forwardly of partition 19 in alignment with opening 21 therein, and supported upon a horizontal flange 27 of an L-shaped member 28, the vertical flange of which is welded or otherwise fixed to the inner face of wall 12'. Light rays (indicated by arrows in FIGURES 2 and 4) from reflector 23 will be projected through lens system 26 upon a first mirror 29, which reflects same hence onto a second mirror 30, suitably suspended as by a bracket 31 from top wall 15, so that the light rays impinging thereon may be directed upon a screen 32, as of ground glass from behind which screen 32 is received within a window 33 in front wall 14, whereby individuals may view the projected matter from the exterior of housing 11.

Carrier A is adapted for disposition within housing 11 through a transversely extending narrow slot-like opening 34, formed in top wall 15. The end edges of said opening 34 are continuous with transversely aligned vertical guides or channels 35, 35' extending from top wall 15 to base wall 16, and being maintained in position as by brackets 36. The side edges of carrier A are received within said guides 35, 35' for slideable movement therealong as said carrier progresses downwardly within housing 11 during operation. Said guides 35, 35' serve to maintain carrier A in requisite attitude during operation for effective and reliable projection and reproduction of the materials carried thereon.

Substantially centrally of its bottom edge 2, carrier A is provided with an upwardly extending opening 37 for traveling engagement of the inner edges thereof, with the operating edge 38 of a spiral cam 39 carried upon the drive shaft 40 of a motor 41, suitably bolted to base wall 16 and connected as by cord 42 to a convenient source of electrical power. Carried upon drive shaft 40, between motor 41, and spiral cam 39, is a control cam 43, provided throughout its peripheral extent with vertically extending circumferentially equidistant ridges 44, separated by valleys 45. Presented for contactive engagement with control cam 43 is a switch arm 46 for motor 41, whereby, when switch arm 46 is engaged upon a ridge 44, motor 41 will be deenergized and when said switch arm 46 rides within a valley 45, the said motor will be energized. The angular increments between adjacent ridges is pre-determined so that spiral cam 39 will travel through a prescribed arcuate path during each period of energization of motor 41. The diameter of spiral cam 39 and the angularity of its spiral are so determined with relationship to the speed of motor 41, and the period of energization thereof brought about through the coaction of switch arm 46 and control cam 43, that during each such course of angular movement of said cam 39, carrier A will be caused to descend such vertical distance as to allow a succeeding film strip frame 8 to be presented for projection. As may best be seen in FIGURE 3, in its initial or starting position, cam 39 will be disposed for causing the lowermost film strip frame 8 to be aligned with opening 21, in partition plate 19 for projection of same. The operation of cam 39 together with the associated elements above described cause carrier A to stepwise drop, so that the next succeeding film strip frame 8 is presented for projection.

After the particular film strip frame 8 has been viewed, in order to reinstitute operation, the viewer need only depress a manual start button 47, conveniently presented on front wall 14, and connected to motor 41, to momentarily energize same for effecting rotation of control cam 43 which latter will cause switch arm 46 to move into the next succeeding valley 45 of cam 43 for providing continued current to motor 41, so the same will be energized until arm 46 is next received on the successive ridge 44, bringing about motor stoppage.

In view of the foregoing, motor 41 is alternately energized and deenergized to bring about orderly descent of carrier A for sequential projection of film strip frames 8, from bottommost to topmost with carrier A moving through a vertical path and being maintained in horizontal disposition by guides 35 and cam 39.

Presented for traversing sound tracks 10a, 10b, 10c for each film strip frame 8 being projected, are related magnetic sound heads 48a, 48b, and 48c, respectively, which are carried within holders or mounts 49 (see FIGURE 9), each of which are integrally provided with laterally projecting ears 50, slideably received upon pins 51, which extend rearwardly for fixed reception at their rearward ends within socket-forming supports 52, which latter are mounted upon a sprocket drive chain 53. Disposed encirclingly about each pin 51 is a coil spring 54, which bear at their ends against the proximate ears 50 and supports 52 for urging holders 49 forwardly to assure proper engagement of the related magnetic sound heads 48a, 48b, 48c, as the case may be, with the associated sound track.

Drive chain 53 is of the endless type, being trained engagingly about a pair of transversely spaced apart sprocket wheels 55, 55'. Sprocket wheel 55 is mounted for rotation upon a stub shaft 56 suitably journaled at its ends within bearings (not shown) in a pair of parallel vertically presented plates 57, 58, while sprocket wheel 55' is mounted upon a shaft 59 similarly journaled in bearing plates 57, 58, but with its rearward end projecting beyond said latter plate for mounting a pulley 60, about which is trained the upper portion of an endless drive belt 61, the opposite or lower portion of which is engaged upon a pulley 62 carried upon the drive shaft 63 of a motor 64, suitably secured upon a vertically presented support plate 65. Motor 64 is suitably connected as by cord 66 to a convenient source of electrical power exterior of housing 11. Upon energization of motor 64, sprocket 55' will be caused to rotate for driving chain 53 through its prescribed upper and lower courses for presenting magnetic heads 48a, 48b, 48c in predetermined sequence to the related sound tracks on carrier A.

Magnetic head mounts 49 are mutually equidistant upon chain 53 so that upon the completion of traverse of the related sound track by one of said heads 48, the next successive one will be in position to commence its operative travel across its related sound track. In effect, the distance between heads 48a, 48b, 48c, is substantially the same as the length of the sound tracks 10, with chain 53 being of appropriate length. The individual heads 48a, 48b, 48c will be relatively elevated within their respective mounts 49 for requisite positioning with respect to the related sound track 10, compensating for the height differential in presentation upon carrier A of the three sound tracks 10 comprising each sound recorded increment.

Projecting upwardly from the normally upper or outer surface of each mount 49, in circuit with the related sound heads 48a, 48b, 48c, is a pair of contact arms 67, 67', for circuit-making reception within conductive channels 68, 68', carried upon the under surface of an insulated support member 69, presented in overlying relationship to the upper course of chain 53 and being suitably carried at the upper end of plate 57. During its operative travel with respect to its related sound track 10, each magnetic head will be brought into circuit-completing engagement with a conventional amplifier (not shown), of the sound reproduction system of device B, which, not forming a part of the present invention, may be of any well-known character.

To assure proper disposition of sound heads 48a, 48b, 48c, there is provided a support 70, being of general channel section, having upper and lower horizontal parallel flanges 71, 72, respectively, for slideable movement against the outwardly directed faces thereof by said magnetic heads during operation of chain 53.

Although various expedients might be utilized for operation of the control of device B, one such mode may be the provision of a switch-tripping arm on the magnetic head 48c, so that as the same completes its reproducing traverse and terminates the sound material for a particular film strip frame, a microswitch may be tripped which would activate the film advance mechanism as above described. Upon such action, the reading head 48a is in position for traverse of the lower track of the series associated with the next successive film strip frame.

As developed hereinabove, carrier A constitutes a marked advance in the art for the ease of storage and retrieval of matter for picture projection and sound reproduction, assuring at all times of positive synchronization and being amenable to projection and reproduction by various types of devices incorporating current mechanisms. Device B, above described, constitutes one type of device which could be used with maximum efficiency.

It should be understood that changes and modifications in the formation, construction, arrangements, and combination of the several parts of the Film-Strip and Sound Track Carrier may be made and substituted for these herein shown and described without departing from the nature and principle of my invention.

Having thus described my invention, what I claim and desire to secure by Letters Patent is:

1. In combination, a unitary film strip and sound track carrier having a vertically presented series of frames of projectable pictorial material and a plurality of tracks of sound reproducible material associated with each frame, said tracks being presented transversely of said carrier with their axes being normal to the path of movement of said frames for sequential projection, with an audio-visual device comprising a housing, projection means, a sound reproducing head for each sound track associated with each frame and means for effecting traverse of said sound heads along a path perpendicular to the axis of said frames, means for presenting said unitary film strip and sound track carrier for projection of one of said frames, means for advancing said film strip and sound track carrier for sequential projection of said frames, said carrier advancing means comprising a spiral cam, said carrier having an opening in its lower margin for coacting with the operating edge of said cam, and means for effecting intermittent rotation of said cam, and means for presenting said sound reproducing heads to the related tracks during projection of the associated frame for simultaneously providing projection and sound reproduction.

2. A combination as defined in claim 1 and further characterized by control means for effecting initiation of operation of said sound reproducing means in timed relation to presentation of the associated frame for projection.

3. A unitary film strip and sound track carrier for use in audio-visual devices comprising a flat body portion, said body portion having a vertically extending recess, a film strip slidably received within said recess, said film strip comprising a single length of individual projectable pictorial frames in vertical arrangement one above the other, and a plurality of sound tracks arranged transversely of said body portion in immediate lateral adjacency to said frames and extending along an axis normal to the vertical axis thereof, each of said sound tracks relating to a single pictorial frame and being disposed within an area on said body portion defined by the upper and lower limits of the pictorial frame to which it relates.

References Cited

UNITED STATES PATENTS

| | | | |
|---|---|---|---|
| 2,144,738 | 1/1939 | Musumeci | 352—26 |
| 3,230,824 | 1/1966 | Schwartz | 88—28 |
| 2,136,209 | 11/1938 | Finch. | |
| 3,141,374 | 7/1964 | Berry. | |
| 3,182,548 | 2/1965 | Berlings. | |
| 3,238,842 | 3/1966 | Wiklund et al. | |
| 3,302,520 | 2/1967 | Dimitracopoulos et al. | |

FOREIGN PATENTS 1,045,122 11/1958 Germany.

NORTON ANSHER, *Primary Examiner.*

RICHARD M. SHEER, *Assistant Examiner.*

U.S. Cl. X.R.

353—120